United States Patent
Hunt

(10) Patent No.: US 11,526,706 B2
(45) Date of Patent: Dec. 13, 2022

(54) SYSTEM AND METHOD FOR CLASSIFYING AN OBJECT USING A STARBURST ALGORITHM

(71) Applicant: Denso International America, Inc., Southfield, MI (US)

(72) Inventor: Shawn Hunt, Pinckney, MI (US)

(73) Assignee: Denso International America, Inc., Southfield, MI (US)

(*) Notice: Subject to any disclaimer, the term of this patent is extended or adjusted under 35 U.S.C. 154(b) by 582 days.

(21) Appl. No.: 16/597,286

(22) Filed: Oct. 9, 2019

(65) Prior Publication Data

US 2021/0110199 A1  Apr. 15, 2021

(51) Int. Cl.
| | | |
|---|---|---|
| G06V 20/58 | (2022.01) | |
| G06K 9/62 | (2022.01) | |
| G01S 17/89 | (2020.01) | |
| G01S 17/931 | (2020.01) | |
| G06V 10/147 | (2022.01) | |
| G06V 40/10 | (2022.01) | |
| G01S 7/483 | (2006.01) | |

(52) U.S. Cl.
CPC .............. *G06K 9/627* (2013.01); *G01S 17/89* (2013.01); *G01S 17/931* (2020.01); *G06V 10/147* (2022.01); *G06V 40/103* (2022.01); *G01S 7/483* (2013.01); *G06V 2201/08* (2022.01)

(58) Field of Classification Search
CPC ....... G06K 9/627; G01S 17/931; G01S 17/89; G01S 7/483; G01S 7/4802; G06V 40/103; G06V 10/147; G06V 2201/08; G06V 20/58; G06V 20/647
See application file for complete search history.

(56) References Cited

U.S. PATENT DOCUMENTS

2009/0018712 A1* 1/2009 Duncan ............... G09B 19/167
701/2
2015/0296135 A1  10/2015 Wacquant et al.
(Continued)

OTHER PUBLICATIONS

Li et al., "Starburst: A hybrid algorithm for video-based eye tracking combining feature-based and model-based approaches," 2005 IEEE Computer Society Conference on Computer Vision and Pattern Recognition, pp. 1-8 (2005).
(Continued)

*Primary Examiner* — Syed Haider
(74) *Attorney, Agent, or Firm* — Christopher G. Darrow; Darrow Mustafa PC

(57) ABSTRACT

A system for classifying an object may include one or more processors, a sensor and a memory device. The memory device may include a data collection module, a starburst module, and an object classifying module. The modules have instructions that when executed by the one or more processors cause the one or more processors to obtain three dimensional point cloud data from the sensor, identify at least one cluster of points representing the object within the three dimensional point cloud data, identify a center point of the at least one cluster of points, project a plurality of rays from the center point to points of the at least one cluster of points to generate a shape, compare the shape to a plurality of candidate shapes, and classify the object when the shape matches at least one of the plurality of candidate shapes.

20 Claims, 6 Drawing Sheets

(56) References Cited

U.S. PATENT DOCUMENTS

2019/0180467 A1* 6/2019 Li ........................ G01S 17/931
2020/0134372 A1* 4/2020 Roy Chowdhury . G05D 1/0221

OTHER PUBLICATIONS

Schnabel et al., "Efficient RANSAC for Point-Cloud Shape Detection," Computer Graphics Forum, vol. 26, Issue 2, 12 pages (2007).

Wang & Posner, "Voting for Voting in Online Point Cloud Object Detection," Robotics: Science and Systems, 9 Pages (2015).

* cited by examiner

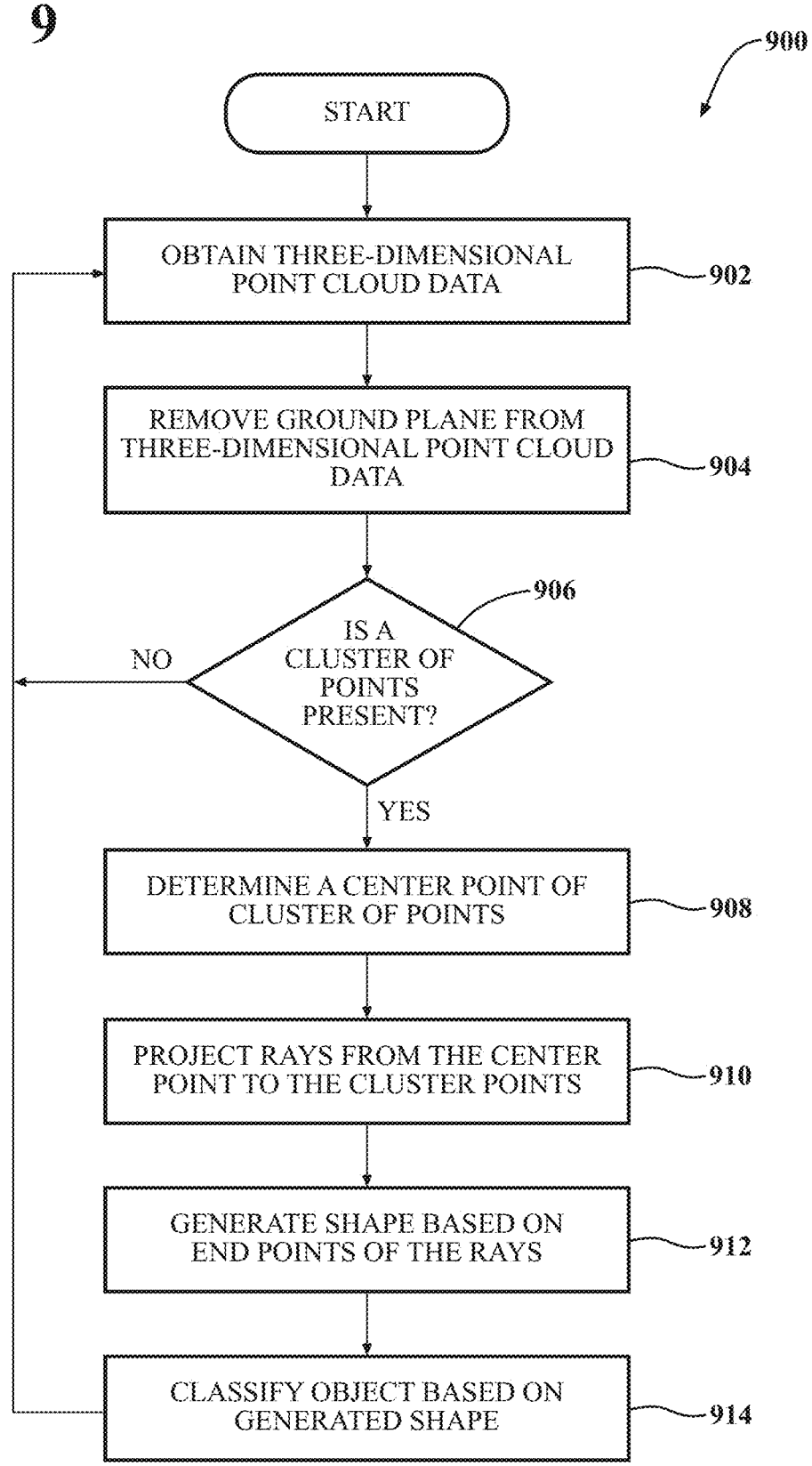

SYSTEM AND METHOD FOR CLASSIFYING AN OBJECT USING A STARBURST ALGORITHM

TECHNICAL FIELD

The subject matter described herein relates, in general, to systems and methods for classifying objects.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with sensors that are able to detect objects surrounding the vehicle. One type of sensor that some vehicles utilize is a light detection and ranging ("LiDAR") sensor. A LiDAR sensor operates by emitting laser pulses and detecting the laser pulses reflected back by objects towards the unit. LiDAR sensors are somewhat similar to radar sensors but use laser pulses rather than radio waves. Devices can only collect information for objects the same size as the wavelength emitted or larger, but not smaller. Since the laser pulses may have wavelengths several orders of magnitude smaller than those of radio waves, LiDAR sensors can detect much smaller particles. However, with this ability to detect much smaller particles, comes the drawback that significantly larger amounts of data are generated by LiDAR sensors. As such, significant processing power is required in order to detect and classify objects detected by the LiDAR sensor.

SUMMARY

This section generally summarizes the disclosure and is not a comprehensive explanation of its full scope or all its features.

In one embodiment, a system for classifying an object includes one or more processors, a sensor, and a memory device. The sensor and the memory device may be in communication with the one or more processors. The memory device includes a data collection module, a starburst module, and object classifying module. The data collection module includes instructions that when executed by the one or more processors cause the one or more processors to obtain three dimensional point cloud data from the sensor.

The starburst module includes instructions that when executed by the one or more processors cause the one or more processors to identify at least one cluster of points representing the object within the three dimensional point cloud data, identify a center point of the at least one cluster of points, and project a plurality of rays from the center point to points of the at least one cluster of points to generate a shape.

The object classifying module includes instructions that when executed by the one or more processors cause the one or more processors to compare the shape to a plurality of candidate shapes and classify the object when the shape matches at least one of the plurality of candidate shapes.

In another embodiment, a method for classifying an object includes the steps of obtaining three dimensional point cloud data from a sensor, identifying at least one cluster of points representing the object within the three dimensional point cloud data, identifying a center point of the at least one cluster of points, projecting a plurality of rays from the center point to points of the at least one cluster of points to generate a shape, comparing the shape to a plurality of candidate shapes, and classifying the object when the shape matches at least one of the plurality of candidate shapes.

In still another embodiment, a non-transitory computer-readable medium for classifying an object includes instructions that when executed by one or more processors cause the one or more processors to obtain three dimensional point cloud data from a sensor, identify at least one cluster of points representing the object within the three dimensional point cloud data, identify a center point of the at least one cluster of points, project a plurality of rays from the center point to points of the at least one cluster of points to generate a shape, compare the shape to a plurality of candidate shapes, and classify the object when the shape matches at least one of the plurality of candidate shapes.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 9 illustrates a method for classifying objects using a starburst algorithm.

DETAILED DESCRIPTION

A system and related method for classifying objects may include one or more processors in communication with a sensor, such as a LiDAR sensor. The LiDAR sensor is configured to generate point cloud data based on the environment that is within the field-of-view of the LiDAR sensor and provide the point cloud data to the one or more processors. The one or more processors are configured to remove a ground plane and any other unnecessary information from the point cloud data, leaving point cloud data related to objects. Objects in the point cloud data may be seen as clusters of points.

The one or more processors utilize a starburst algorithm to determine the overall shape of the objects in the point cloud data. The starburst algorithm first determines a center of the cluster of points. Thereafter, the starburst algorithm projects rays from the center of the cluster of points outward to the edge of the cluster of points. The terminal ends of the rays are then utilized to generate an overall shape. The one or more processors then compare this generated shape to a set of candidate shapes to determine if there is a match. The candidate shapes are shapes that are representative of certain objects. If the generated shape matches one of the candidate shapes, the object is then classified based on this match.

Figure 1:
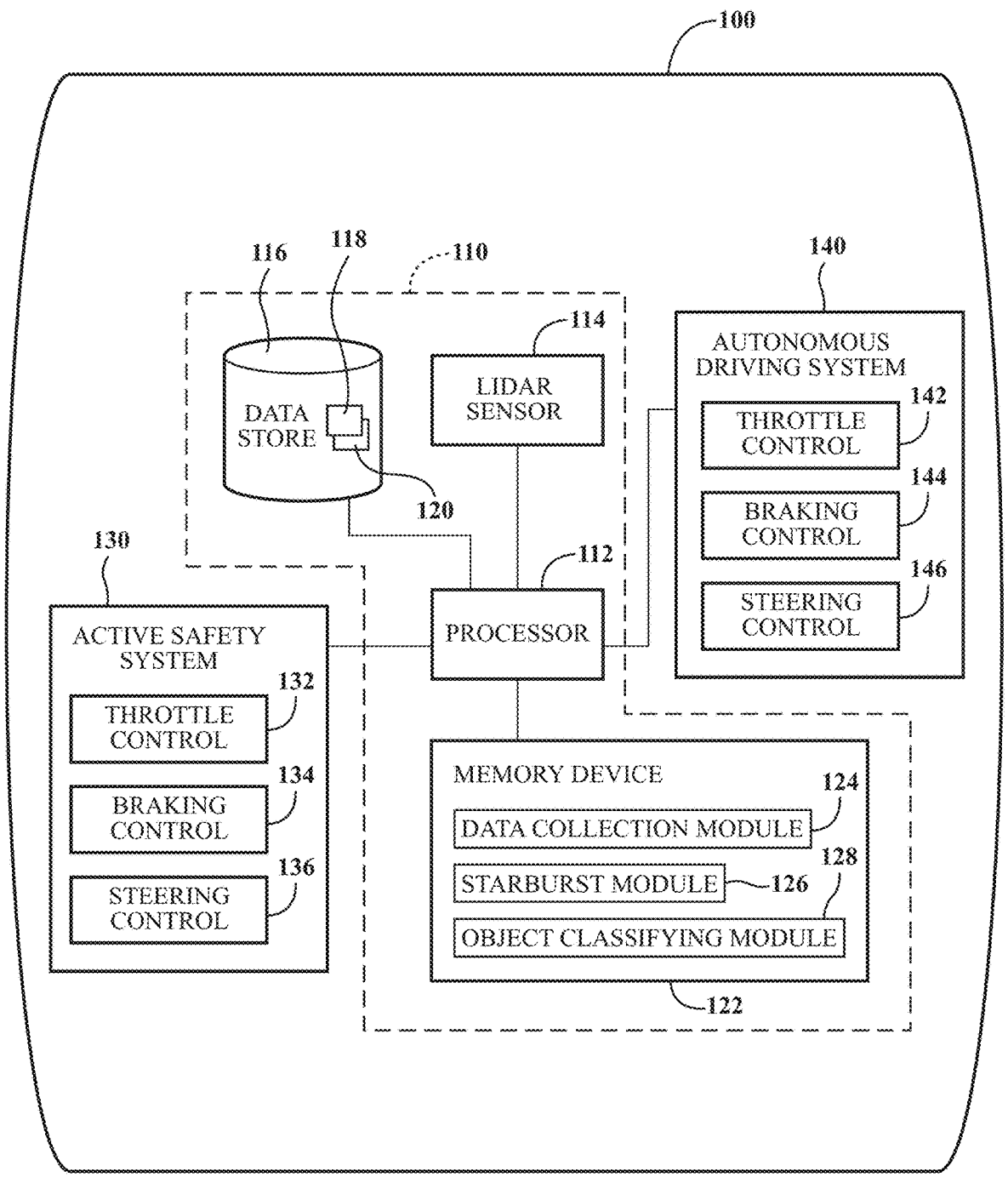
FIG. 1 illustrates a block diagram of a system for classifying objects incorporated within a vehicle.

Referring to FIG. 1, a vehicle 100 incorporating a system 110 for classifying objects is shown. The vehicle 100 may be any one of a number of different types of vehicles capable of transporting persons or items from one location to another. In the example shown in FIG. 1, the vehicle 10 is in the form of an automobile. However, the vehicle 10 may take any one of several different forms, such as a truck, heavy-duty truck, tractor-trailer, tractor, mining vehicle, military vehicle, and the like. In addition, the vehicle 10 may not be limited to ground-based vehicles but could also include aircraft and seagoing vessels as well. In addition, it should be understood that the system 110 may be incorporated in other devices and not necessarily vehicles. For example, the system could be incorporated in any type of device or structure that allows for the detecting and classification of objects.

With regards to the system 110, the system 110 may include one or more processors 112. The one or more processors 112 may be a single processor or may be multiple processors working in concert. Additionally, it should be understood that the one or more processors 112 may be in the form of a distributed system, wherein methods performed by the one or more processors 112 may be executed by processors that are remote to the system 110 and may be further remote from the vehicle 100.

A sensor 114 may be in communication with the one or more processors 112. In this example, the sensor 114 is a LiDAR sensor, but it should be understood that other types of sensors may also be utilized, such as radar sensors, sonar sensors, camera systems, and the like. The LiDAR sensor may operate by emitting laser pulses and detecting the laser pulses reflected back by objects towards the unit. The LiDAR sensor 114 may be mounted to the vehicle 100 such that the LiDAR sensor 114 has a field-of-view of at least a portion of the environment in which the vehicle 100 operates. In one example, the LiDAR sensor 114 may be a rotating LiDAR sensor that is mounted to a roof of the vehicle 100.

A data store 116 is in communication with the one or more processors 112. The data store 116 may be a device capable of storing information that can be utilized by the one or more processors 112. The data store 116 may store one or more types of data. The data store 116 can include volatile and/or non-volatile memory. Examples of suitable data stores 32 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 116 can be a component of the one or more processors 112 or the data store 116 can be operatively connected to the one or more processors 112 for use thereby. The term "operatively connected" and/or "in communication with" as used throughout this description, can include direct or indirect connections, including connections without direct physical contact. The data store 116 may include collections 118 and/or 120 of one or more candidate objects. As will be explained later, these candidate objects are utilized to classify objects detected by the system 110.

A memory device 122 may also be in communication with the one or more processors 112. The memory device 122 may be any type of memory capable of storing information that can be utilized by the one or more processors 112. As such, the memory device 122 may include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. In this example, the memory device 122 is separate from the one or more processors 112, but it should be understood that the memory device 122 may be incorporated within any of the one or more processors 112, as opposed to being a separate device. Furthermore, it should be understood that the memory device 122 and the data store 116 may be incorporated with each other and may not be separate devices as shown.

The memory device 122 may be capable of storing one or more modules that when executed by the one or more processors 112 cause the one or more processors 112 to perform any one of several different methods disclosed in this disclosure. In this example, the memory device 122 includes a data collection module 124, a starburst module 126, and an object classifying module 128.

Figure 2:
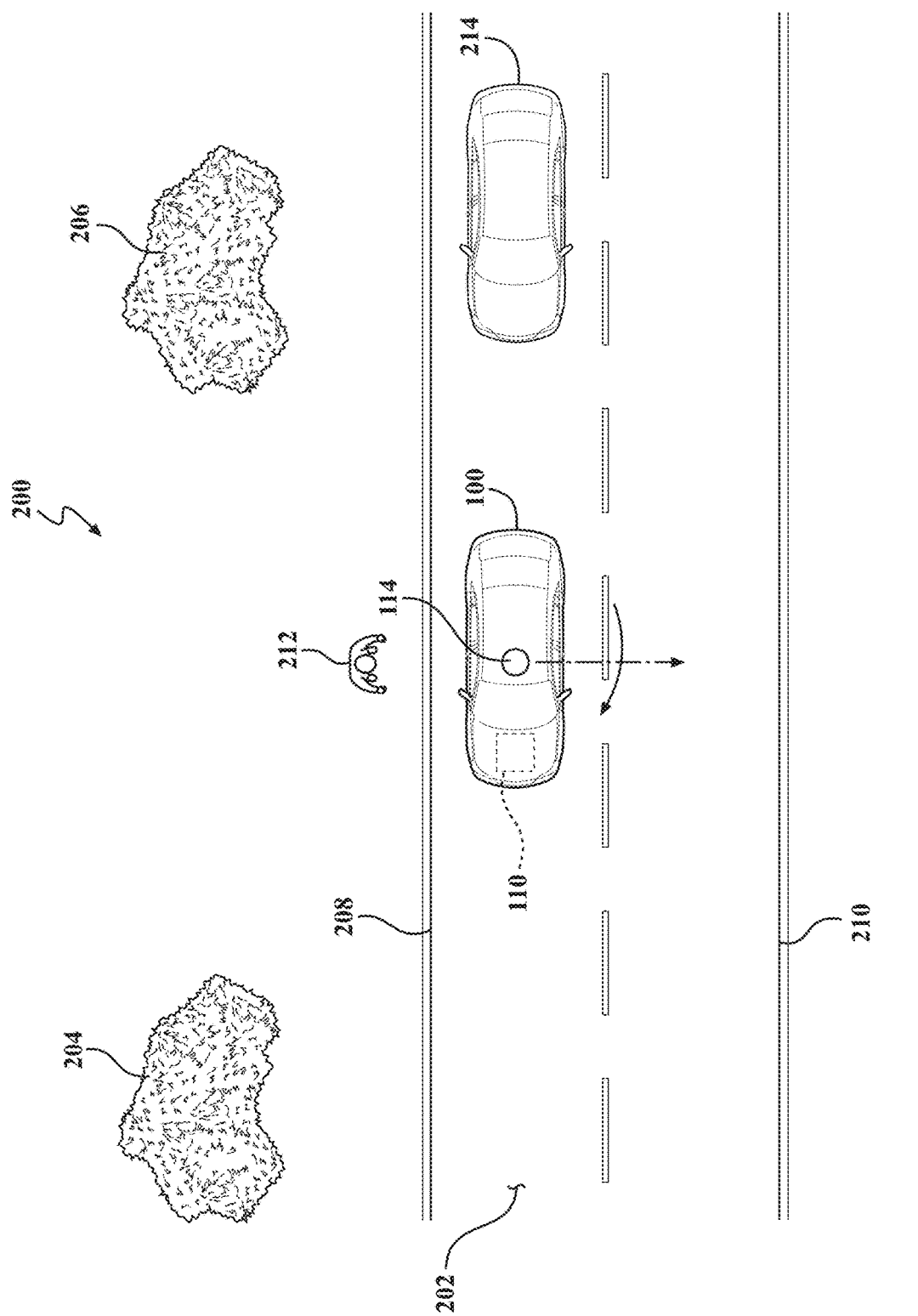
FIG. 2 illustrates the vehicle of FIG. 1 having the system for classifying objects operating in an environment.

The data collection module 124 causes the one or more processors 112 to collect information regarding the surrounding environment. In this example, the data collection module 124 causes the one or more processors 112 to receive point cloud data captured by the LiDAR sensor 114. Referring to FIG. 2, the vehicle 100 having the system 110 and the LiDAR sensor 114 operating in an environment 200 is shown. The vehicle 100 is traveling on a roadway 202 that has curbs 208 and 210. The environment 200 also includes trees 204 and 206 as well as a pedestrian 212 and another vehicle 214 that is traveling behind the vehicle 100. The LiDAR sensor 114 may be mounted to a roof of the vehicle 100 and may rotate about in a direction capturing point cloud information of the surrounding environment 200.

Figure 3:
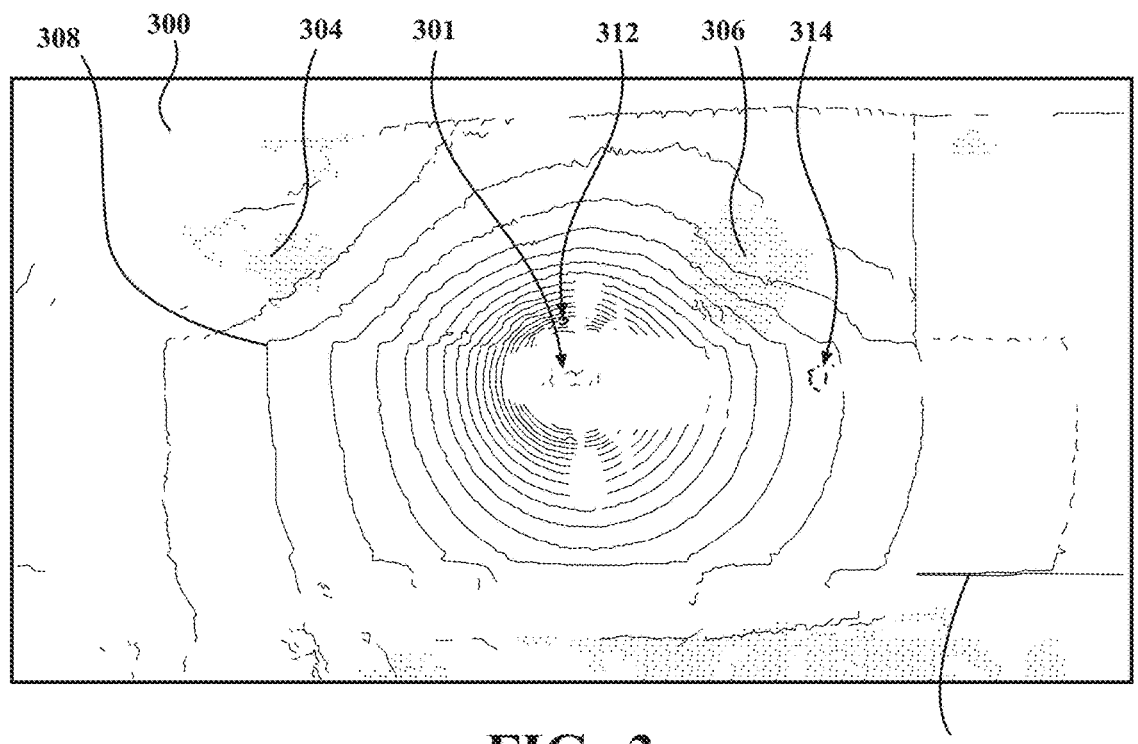
FIG. 3 illustrates point cloud data captured by a LiDAR sensor.

Referring to FIG. 3, an example of the point cloud data 300 captured by the LiDAR sensor 114 is shown. In this example, the point cloud data 300 includes a series of points in a three-dimensional space and is illustrated from an overhead view of the vehicle 100, similar to that of FIG. 2. Here, a cluster of points 301 may be representative of the vehicle 100. A cluster of points 312 may be representative of the pedestrian 212, while a cluster of points 314 may be representative of the vehicle 214. The cluster of points 304 and 306 may respectfully represent the trees 204 and 206, while a cluster of points 308 and 310 may respectively represent the curbs 208 and 210. As stated before, the data collection module 124 causes the one or more processors 112 to collect point cloud information, such as the point cloud data 300 of FIG. 3.

Figure 4:
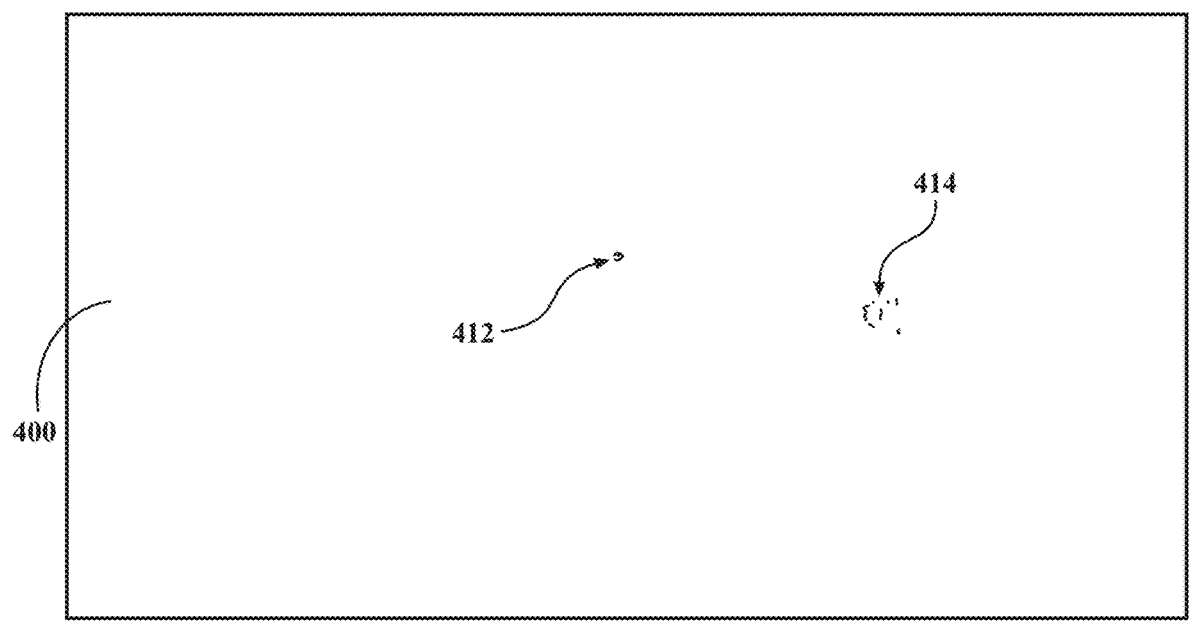
FIG. 4 illustrates the point cloud data of FIG. 3 with ground plane related data and other data removed.

The starburst module 126 causes the one or more processors 112 to interpret the point cloud data 300. In one example, the starburst module 126 causes the one or more processors 112 to remove ground plane information and/or other information for improved processing. Here, as best shown in FIG. 4, the starburst module 126 causes the one or more processors 112 to remove ground plane information and/or other information such as the points 304 and 306 representing the trees 204 and 206 and the cluster of points 308 and 310 representing the curbs 208 and 210, respectively. The starburst module 126 may also cause the processor 112 to remove the cluster of points 301 that represent the vehicle 100.

In order to improve processing, the starburst module 126 may cause the one or more processors 112 to create a two dimensional image from the point cloud data 300. As such, as best shown in FIG. 3, the point cloud data 300 may be flattened to create a two-dimensional image to improve processing performance. This may occur before or after ground plane and other data has been removed.

FIG. 4 illustrates the remaining point cloud data 400 after different clusters of data points including the ground plane and other items mentioned in the paragraph above have been removed. Here, the remaining point cloud data 400 includes a cluster of points 412 relating to the pedestrian 212 and a cluster of points 414 relating to the vehicle 214.

Figure 5:
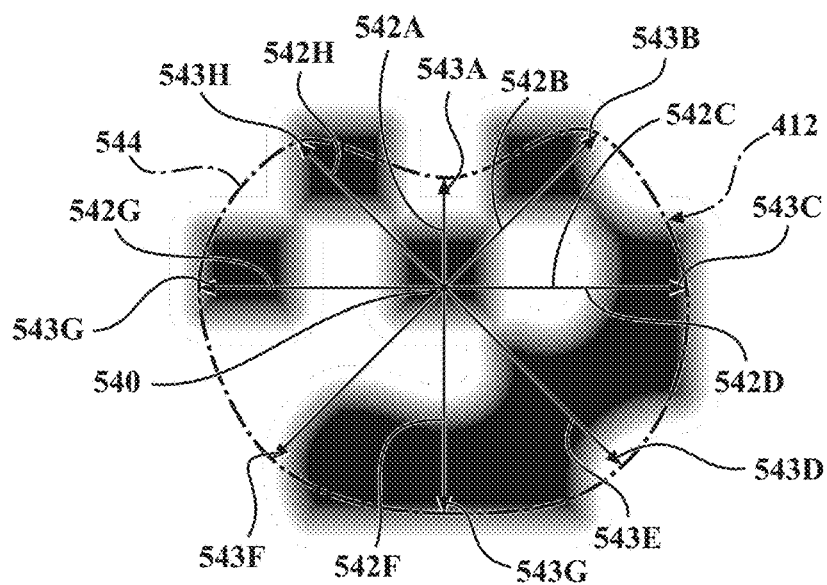
FIGS. 5 and 6 illustrate applying a starburst algorithm to point cloud data of two different objects.

In order to classify the cluster of points 412 and 414, the starburst module 126 causes the one or more processors 112 to apply a starburst type of algorithm to the cluster of points 412 and/or 414. For example, as shown in FIG. 5, the cluster of points 412 are shown and are enlarged to show greater detail. The starburst module 126 may first determine if the cluster of points 412 represents some type of object or simply noise. In order to determine this, the starburst module 126 may simply compare the cluster of points 412 to one or more shapes, to see if there is a general rough match to one or more shapes. It should be understood that this step may be optional and does not necessarily need to be performed.

The starburst module 126 may cause the one or more processors 112 to determine a center point 540 representing an overall center or centroid of the cluster of points 412. Any one of a number of different algorithms may be utilized to determine the center point 540. For example, the position of each point of the cluster of points 412 may be averages so as to determine the center point 540.

Once the center point 540 has been determined, the starburst module 126 causes the one or more processors 112 to extend from the center point 540 a plurality of projections or rays 542A-542H. In this example, the plurality of rays 542A-542H includes eight rays 542A-542H extending from the center point 540. However, it should be understood any one of a number of different rays may be utilized. Generally, the angle between the rays are substantially equal. As such, in this example, the angle between each of the rays 542A-542H would be approximately 45°. However, as more or fewer rays are utilized, the angles would be adjusted accordingly. Furthermore, it should be understood that the rays do not need to be such that they are equal between each of the rays.

Each of the rays 542A-542H have terminal ends 543A-543H. The terminal ends 543A-543H are dictated when the ray reaches an outside of the cluster of points 412. As an example, the terminal end 543B ends near the outer limit of the cluster of points 412 with respect to the center point 540. In the event that a ray continues beyond the cluster of points 412 because the ray did not come into contact with one of the cluster of points 412, the ray may be deemed unusable and will be discarded. The terminal ends 543A-543H may be utilized to generate a shape 544. The shape 544 may be a shape generated when the terminal ends 543A-543H are connected serially to each other. In this example, the shape 544 is similar to that of a circle, the significance of which will be explained later in this disclosure.

Figure 6:
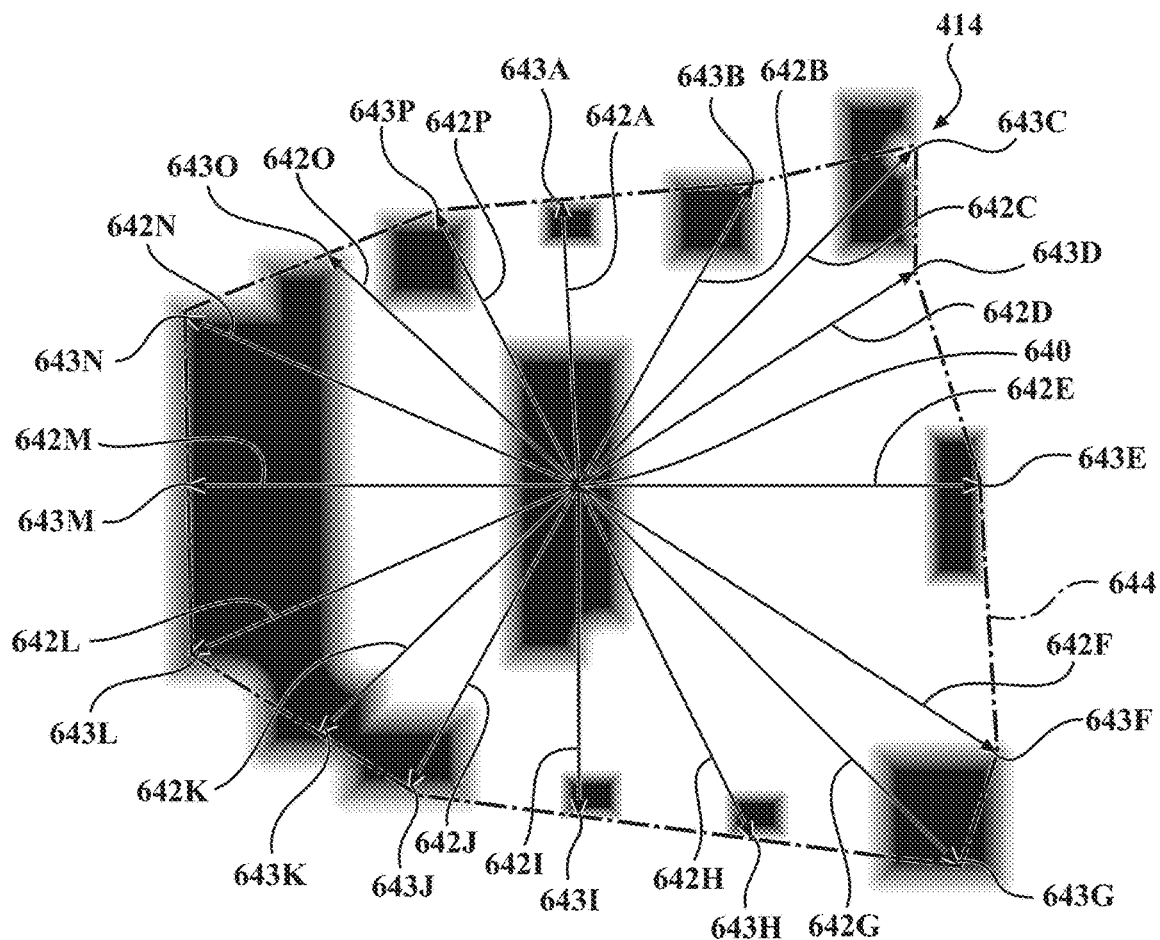

As another example, referring to FIG. 6, the cluster of points 414 representing the vehicle 214 are shown. Like before, a center point 640 is determined from the cluster of points 414. The center point 640 may be calculated using algorithms previously described so as to determine the overall center of the cluster of points 414. Once the center point 640 has been determined, the starburst module 126 may cause the one or more processors 112 to project a plurality of rays 642A-642P from the center point 640. In this example, a total of 16 rays are projected. The angle between each of the rays 642A-642P may be substantially equal and may be approximately 22.5°. Of course, it should be understood that the angle between each of the rays 642A-642P may vary based on the number of projected rays. Furthermore, the angles may vary such that each of the angles are not necessarily equal between each of the rays 642A-642P. Like before, each of the rays 642A-642P end with a termination end 643A-643P. The starburst module 126 causes the one or more processors 112 to construct a shape 644 by serially connecting the terminal ends 643A-643P of the rays 642A-642P, respectively.

Figure 7:
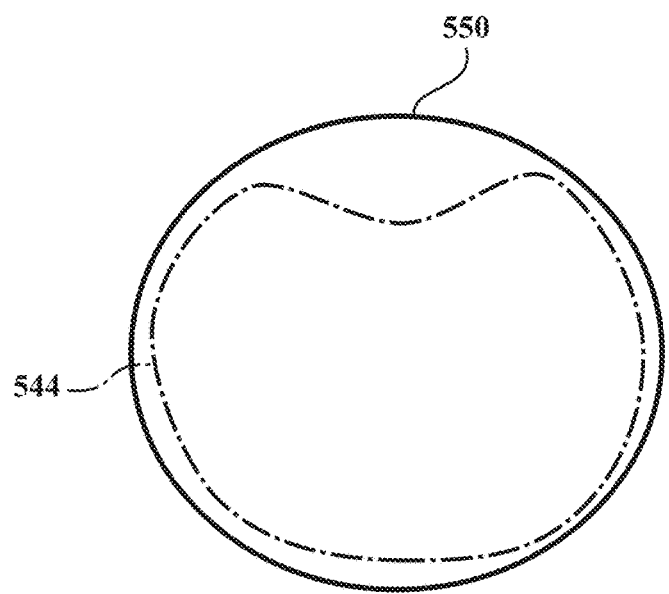
FIGS. 7 and 8 illustrate matching shapes generated by the starburst algorithm to classify two different objects.
Figure 8:
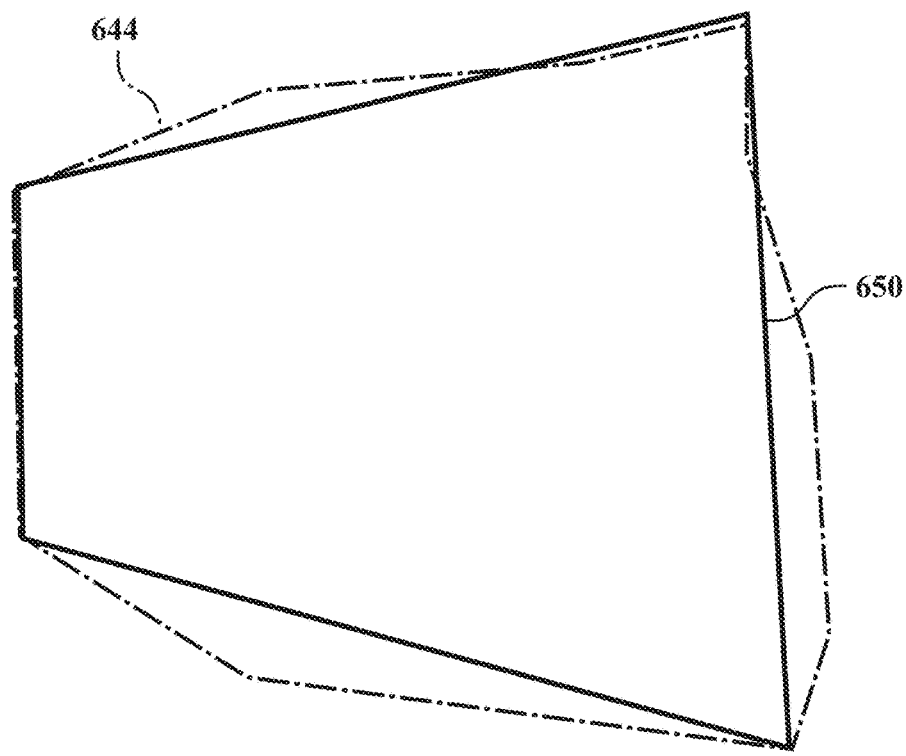

Referring to FIGS. 7 and 8, the shapes 544 and 644 are shown, respectively. Here, the object classifying module 128 causes the one or more processors 112 to compare the shape 544 to a list of candidate shapes, which may be stored on the data store 116 as collection 118 and/or 120. The list of candidate shapes could include a number of different shapes, such as circular type shapes, rectangles, squares, triangles, and the like. The example shown in FIG. 7, the one or more processors 112 have determined that the shape 544 matches a circular shape 550. In the example shown in FIG. 8, the one or more processors 112 have determined that the shape 644 matches a trapezoidal shape 650.

The object classifying module 128 causes the one or more processor 112 to determine that because the shape 544 most likely matches a circular shape 550 from the candidate shapes, the cluster of points 312 that were the basis for the shape 544, are representative of a pedestrian. Generally, it is been observed that circular type shapes of a certain size may be representative of pedestrians in an overhead view of a cluster of points.

In FIG. 8, the object classifying module 128 causes the one or more processors 112 to determine that the shape 644 is most similar to a trapezoidal shape 650 from the candidate shapes. The object classifying module 128 causes the one or more processors 112 to determine that since a trapezoidal shape 650 is the matching shape, the cluster of points 414 generally represent an object that is a vehicle. It has been observed that when a generated shape matches a rectangular shape, such as a trapezoid, the cluster of points that form the basis for the generated shape may be a vehicle such as vehicle 214.

Once the pedestrian 212 and the vehicle 214 have been classified as a pedestrian and a vehicle, these classifications may be provided from the one or more processors 112 to a number of different vehicle systems. In one example, the vehicle systems could include an active safety system 130. The active safety system 130 may be a collection of vehicle systems that allow for the vehicle 100 to perform some type of collision avoidance action. For example, the active safety system 130 can control any one of a number of vehicle actuators such as a throttle control 132, a braking control 134, and/or a steering control 136 to prevent a collision with an object, such as the pedestrian 212 and/or the vehicle 214.

Alternatively or additionally, the one or more processors 112 may provide the classification information regarding the pedestrian 212 and the vehicle 214 to an autonomous driving system 140. The autonomous driving system 140 may have the ability to pilot the vehicle 100 with little or no human input. To those ends, the autonomous driving system 140 may be able to actuate a throttle control 142, a braking control 144, and/or a steering control 146. It should be understood that while the active safety system 130 and the autonomous driving system 140 are shown to be both included within the vehicle 100, the vehicle 100 may utilize one or both of these systems. Furthermore, it should be understood that the throttle controls 132, 142, the braking controls 134, 144, and/or the steering controls 136, 146 may be replaced and/or supplemented with other types of control systems based on the type of vehicle they are controlling.

Referring to FIG. 9, one example of a method 900 for classifying an object will be discussed from the perspective of the vehicle 100 of FIG. 1. While the method 900 is discussed in combination with the vehicle 100, it should be appreciated that the method 900 is not limited to being implemented within the vehicle 100 but is instead one example of a system that may implement the method 900.

The method 900 begins at step 902, wherein the data collection module 124 causes the one or more processors 112 to obtain three-dimensional point cloud data from one or more sensors, such as the LiDAR sensor 114. In step 904, the starburst module 126 causes the one or more processors 112 to remove ground plane information from the three-dimensional point cloud data. It should be understood that the step 904 may be optional. Furthermore, it should also be understood that the step 904 may remove other information in addition to or alternatively to ground plane information. For example, as shown in FIGS. 3 and 4, the starburst module 126 may cause the one or more processors 112 to remove ground plane information, a cluster of points 304 and/or 306 related to trees, the cluster of points 301 related to the vehicle 100, and/or the cluster of points 308 and/or 310 related to curbs 208, 210 of a roadway.

Next, in step 906, the starburst module 126 causes the one or more processors 112 to determine if a cluster of points is present and/or represents an object, such as a person or another vehicle. This made be determined by performing an initial analysis that determines if the cluster of points is noise or most likely represents an object. If the cluster of points are not present and/or do not represent an object, such as a dynamic object, the method will return to step 902. Otherwise, the method proceeds to step 908.

In step 908, the starburst module 126 causes the one or more processors 112 to determine a center point of the cluster of points. As stated previously, any one of a number of different algorithms may be utilized to determine a center of the cluster of points, such as averaging the locations of each point of the cluster of points to determine an overall central location of the cluster of points.

In step 910, the starburst module 126 causes the one or more processors 112 to project rays from the center point to the cluster of points. The cluster of points may be located on the outside of the cluster. As best shown in FIG. 6, the rays 642A-642P extend from the center point 640 and terminate at terminal ends 643A-643P, respectively. The endpoint may be generally located at the outside of the cluster of points. Once the endpoints have been determined, the method 900 proceeds to step 912, wherein the starburst module 126 causes the one or more processors 112 to generate a shape based on the endpoints of the rays. The shape may be generated by serially connecting each of the terminal ends 643A-643P to each other.

In step 914, the object classifying module 128 causes the one or more processors 112 to classify the object based on the generated shape. As best shown in FIG. 7, the generated shape 544 is compared to a list of candidate objects. In this example, the generated shape 544 most closely matches a circular shape 550 from the candidate shapes. Referring to FIG. 8, the generated shape 644 most closely matches a trapezoidal shape 650 from the list of candidate shapes. As stated before, it has been observed that when the generated shape 544 most closely resembles a circular shape, such as the circular shape 550, the object that is the source of the generated shape 544 may be determined to be a pedestrian. In like manner, if it is determined that the closest matching candidate shape is a trapezoidal shape 650, it may be determined that the shape that form the basis of the generated shape 644 may be a vehicle. Once this information has been determined, this classification information may be provided to any one of a number of different vehicle systems, such as the active safety system 130 and/or an autonomous driving system 140. Of course, it should be understood that any one of a number of different vehicle systems may receive this classifying information from the system 110.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer readable program code embodied, e.g., stored, thereon. Any combination of one or more computer-readable media may be utilized. The computer-readable medium may be a computer readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for classifying an object, the system comprising:
   one or more processors;
   a sensor in communication with the one or more processors;
   a memory device in communication with the one or more processors, the memory device further comprising a data collection module having instructions that when executed by the one or more processors cause the one or more processors to obtain three dimensional point cloud data from the sensor;
   the memory device further comprising a starburst module having instructions that when executed by the one or more processors cause the one or more processors to identify at least one cluster of points representing the object within the three dimensional point cloud data, identify a center point of the at least one cluster of points representing the object, and project a plurality of rays from the center point to points of the at least one cluster of points representing the object to generate a shape of the object; and
   the memory device further comprising an object classifying module having instructions that when executed by the one or more processors cause the one or more processors to compare the shape to a plurality of candidate shapes and classify the object when the shape matches at least one of the plurality of candidate shapes.

2. The system of claim 1, wherein the plurality of rays are projected to points of the at least one cluster of points that are near an outer boundary of the cluster of points.

3. The system of claim 1, wherein the starburst module further includes instructions that when executed by the one or more processors cause the one or more processors to remove data from the three dimensional point cloud data that represents a ground plane.

4. The system of claim 1, wherein the starburst module further includes instructions that when executed by the one or more processors cause the one or more processors to compare the cluster of points to the plurality of candidate shapes and determine that the cluster of points represents the object when the cluster of points matches at least one of the plurality of candidate shapes.

5. The system of claim 1, wherein the starburst module further includes instructions that when executed by the one or more processors cause the one or more processors to determine the center point of the at least one cluster of points by averaging coordinates of all each point forming the at least one cluster of points.

6. The system of claim 1, wherein the object classifying module further includes instructions that when executed by the one or more processors cause the one or more processors to classify the object as a pedestrian when the shape matches a circle shape, and classify the object as a vehicle when the shape matches a rectangular shape.

7. The system of claim 1, wherein the sensor is a light detecting and ranging ("LIDAR") sensor.

8. The system of claim 7, wherein the LIDAR sensor is mounted to a vehicle.

9. A method for classifying an object comprising the steps of:
   obtaining three dimensional point cloud data from a sensor;
   identifying at least one cluster of points representing the object within the three dimensional point cloud data;
   identifying a center point of the at least one cluster of points representing the object;
   projecting a plurality of rays from the center point to points of the at least one cluster of points representing the object to generate a shape of the object;
   comparing the shape to a plurality of candidate shapes; and
   classifying the object when the shape matches at least one of the plurality of candidate shapes.

10. The method of claim 9, wherein the plurality of rays are projected to points of the at least one cluster of points that are near an outer boundary of the cluster of points.

11. The method of claim 9 comprising the step of removing data from the three dimensional point cloud data that represents a ground plane.

12. The method of claim 9, wherein the step of identifying at least one cluster of points further includes the steps of:
    comparing the cluster of points to the plurality of candidate shapes; and
    determining that the cluster of points represents the object when the cluster of points matches at least one of the plurality of candidate shapes.

13. The method of claim 9, further comprising the step of determining the center point of the at least one cluster of points by averaging coordinates of all each point forming the at least one cluster of points.

14. The method of claim 9, further comprising the steps of:
    classifying the object as a pedestrian when the shape matches a circle shape; and
    classifying the object as a vehicle when the shape matches a rectangular shape.

15. The method of claim 9, wherein the sensor is a light detecting and ranging ("LIDAR") sensor.

16. The method of claim 15, wherein the LIDAR sensor is mounted to a vehicle.

17. A non-transitory computer-readable medium for classifying an object and including instructions that when executed by one or more processors cause the one or more processors to:
    obtain three dimensional point cloud data from a sensor;
    identify at least one cluster of points representing the object within the three dimensional point cloud data;
    identify a center point of the at least one cluster of points representing the object;
    project a plurality of rays from the center point to points of the at least one cluster of points representing the object to generate a shape of the object;

compare the shape to a plurality of candidate shapes; and
classify the object when the shape matches at least one of the plurality of candidate shapes.

18. The non-transitory computer-readable medium of claim 17, wherein the plurality of rays are projected to points of the at least one cluster of points that are near an outer boundary of the cluster of points.

19. The non-transitory computer-readable medium of claim 17, further including instructions that when executed by one or more processors cause the one or more processors to remove data from the three dimensional point cloud data that represents a ground plane.

20. The non-transitory computer-readable medium of claim 17, further including instructions that when executed by one or more processors cause the one or more processors to classify the object as a pedestrian when the shape matches a circle shape and classify the object as a vehicle when the shape matches a rectangular shape.

* * * * *